United States Patent [19]
Asterö

[11] 3,979,159
[45] Sept. 7, 1976

[54] PROJECTOR
[75] Inventor: Jan Erik Asterö, Tumba, Sweden
[73] Assignee: Lindaco Ltd., Geneva, Switzerland
[22] Filed: Dec. 4, 1974
[21] Appl. No.: 529,528

[52] U.S. Cl. ............................................. 352/136
[51] Int. Cl.² ....................................... G03B 19/18
[58] Field of Search ...................... 352/136, 79, 80

[56] References Cited
UNITED STATES PATENTS
| | | | |
|---|---|---|---|
| 632,472 | 9/1899 | Roebuck et al. | 352/136 |
| 1,643,541 | 9/1927 | Cawthon | 352/136 |
| 1,721,425 | 7/1929 | Winzenburg | 352/136 |

Primary Examiner—Monroe H. Hayes
Attorney, Agent, or Firm—Toren, McGeady and Stanger

[57] ABSTRACT

There is provided a projector comprising a dia projection system and a film projection system. The main lens system and the light source of the projector are common for the two projection systems. A link mechanism connects the not common parts of the two projection systems. By moving one member of one of the systems transverse to the projector the members of the other system are brought into alignment with the light source and main lens system of the projector and vice versa. The alignment is determined by the two end positions of the link mechanism.

8 Claims, 4 Drawing Figures

PROJECTOR

The present invention refers to a projector for projection of diascopic pictures and/or cinematographic film, comprising a lens system and a light source.

Previously known projectors consist of a unit which is arranged either to project diascopic pictures or cinematographic film. In order to project two types of image bearing material during a show, two types of projectors have hitherto been needed. In the field of teaching this is a severe drawback, in view of the substantial distances the apparatuses normally have to be transported in e.g. schools. For the layman, which increasingly documentizes his experiences in both dia pictures and cinematographic film, the need for two projectors is an economical load.

One object of the invention is to provide a combined diascopic and cinematographic projector, having substantial parts common for the two projection systems.

An other object is to provide a compact projector which easily can be made ready for projection of dia pictures and film respectively by moving the chosen system into alignment with the common parts of the projector.

An other object is to provide a fool proof link mechanism, which permits a simple switch between the projection systems of the projector.

The known technique is represented by the German patent Nos. 386,090 and 420,106 and the U.S. Pat. Nos. 632,472 and 1,317,996.

According to the invention there is provided a projector, which is distinguished by comprising a cinofilm feeding device, which is displaceably guided transverse to the projector, a condensor lens and a link mechanism, which during movement towards its first end position is arranged to a. place the film feeding mechanism and a lens of addition, which possibly may be connected to said mechanism, in alignment with and adjacent to the lens system, b. place the light source adjacent to and in alignment with the film feeding mechanism and c. place the condensor lens out of the light path, said link mechanism being further arranged, during movement towards its second end position to d. place the condensor lens in front of a stationary frame for dia slides and e. displace the light source rearwardly in the direction of the light path to a position behind the condensor lens, whereby the same light source and lens system may be utilized for both dia projection and film projection and whereby the projector can be made ready for the chosen system by moving the link mechanism to a corresponding end portion.

The light source may comprise an ordinary direct radiating reflector bulb but in the present projector it is preferred to transfer the light to the image bearing material via a light transmitting fibre optic.

Suitably the film feeding mechanism and the equipment necessary for film winding are fitted on a sleigh, which is displaceable and guided transverse to the projector. The light source may be fitted on a support, which is axially displaceable. The link mechanism comprises suitably a lever, one arm of which mounts the sleigh and the other arm of which mounts the condensor lens, one free link being pivotably fitted between said support and the free end of said other arm, thereby permitting the end positions of the mechanism to be found by merely a transverse displacement of the sleigh.

The joint between the condensor lens and the film feeding mechanism respectively and the lever may be of the pin and slot type.

Thus, the link mechanism permits a switch of the projector for projection of cinematographic and diascopic film respectively by a simple transverse displacement of the sleigh.

Such a simple and fast switching makes the projector suitable at education, wherein one during a lesson, for example, wants to show clarifying dia pictures during a short brake in the film show.

Further to this, economical advantages are achieved, in that the same lens system, light source and drive means can be used for both the projection systems.

Also, substantial space reductions are won by the present structure.

In the following the projector according to the invention will be closer described by way of example with reference to the accompanying drawings.

Figure 1:
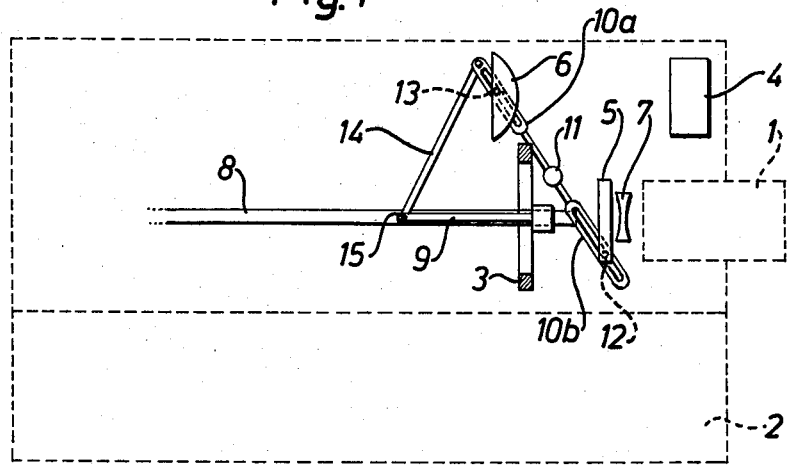
FIG. 1 is a schematic top view of the projector, showing one end position of the link mechanism, the housing and the auxiliary equipment of the projector being shown in phantom.

FIG. 1 shows a projector, the lens system of which is designated 1. At its right side the projector has a channel 2 for a dia slide magazine. Centrally the projector has a stationary frame 3 for dia slides. An automatic feeding mechanism (not shown) may be installed and arranged to accomplish the dia feeding. This feeding mechanism may be arranged to be driven by the driving unit 4 when the link mechanism is in the position according to FIGS. 3 and 4. A film feeding mechanism 5 and a condensor lens 6 are displaceably arranged in the projector. A double concave lens of addition 7 is fitted at the feed mechanism 5, which is coupled to the driving means 4 in the position according to FIGS. 1 and 2. Light is emitted to the projector via a fibre optic 8, which is fed by a light source, not shown. The fibre optic 8 is fitted at a support or carriage 9, which is displaceable and guided in the axial direction of the projector. The condensor lens 6 and the mechanism 5 are displaceable and guided transverse to the projector. A double-armed lever comprising two slotted arms 10a and 10b is pivotably journalled on a pin 11. The mechanism 5 is coupled to the arm 10b via a pin 12. The condensor lens 6 is coupled to the arm 10a via a pin 13. A link arm 14 is pivotably journalled at the end of the arm 10a and a pin 15 at the rear end of the support 9, respectively. A sleigh 16 is fitted at the upper end of the film feed mechanism 5 and is like said mechanism 5 arranged displaceable transverse the projector. A film guide 17 is mounted on the sleigh 16. Film winding rolls 18 and 19 are mounted on the sleigh or carriage 16.

Figure 2:
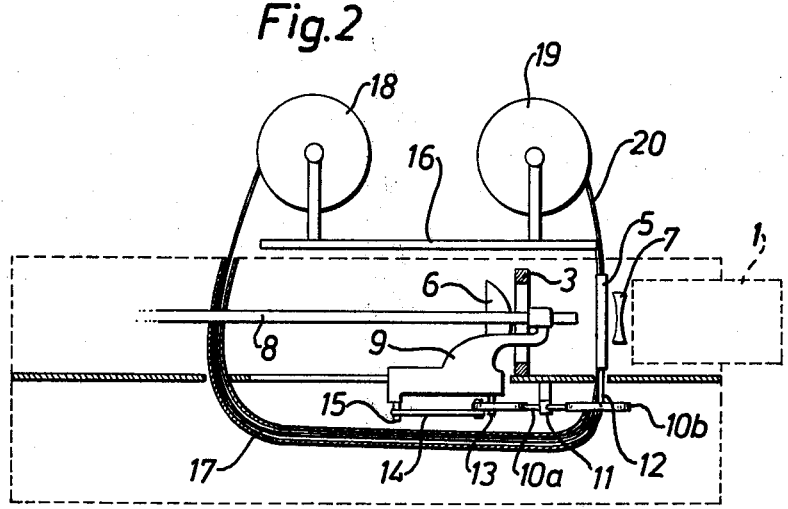
FIG. 2 is a schematic elevational view of the projector according to FIG. 1.

In FIGS. 1 and 2 the projector is shown ready for projection of cinematographic film 20, the link mechanism 9–15 being in the shown position such that the output end of the glass-fibre optic 8 is positioned adjacent and centrally to a film window in the mechanism 5 and such that the condensor lens 6 is remote from the light path.

If one now wishes to make the projector ready for projection of dia pictures, one simply displaces the sleigh 16 to the left, transverse to the projector. The mechanism 5, which is guided transverse of the projector, will then actuate the arm 10b such that the arm 10b pivots around the pin 11. The arm 10a will then simultaneously pivot inwardly toward the central area of the projector and will then bring along the condensor lens 6, which is guided transversely. The link arm 14, which is mounted to the pins 13 and 15, will then drive the support 9 rearwardly in its guide so that the end of the glass fibre optic will arrive behind the condenser lens 6 when the displacement of the sleigh 16 has been completed.

Figure 3:
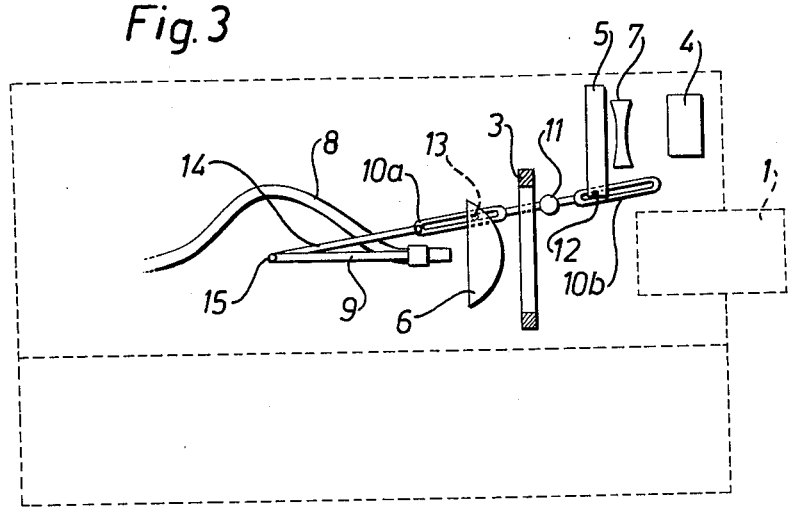
FIG. 3 is a schematic top view of the projector, showing the other end position of the link mechanism, the housing and the auxiliary equipment of the projector being shown in phantom.
Figure 4:
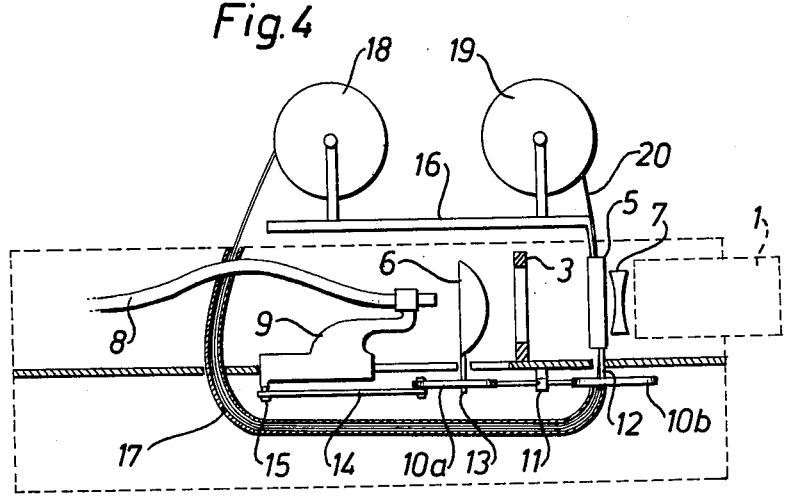
FIG. 4 is a schematic elevational view of the projector according to FIG. 3.

The movable parts of the projector have now arrived to the positions shown in FIGS. 3 and 4 so that the projector now is ready to be used for projection of diascopic pictures.

The lens of addition is used to magnify the cine-film image to a size corresponding to the size of the dia picture so that the projected image will have the same size whether one projects cinematographic film or dia pictures.

It should be appreciated that the projector may be put in order again for projection of cinematographic film by displacing the sleigh 16 to the right hand end position, that is, the position shown in FIGS. 1 and 2.

It should also be noted that the two projection systems of the projector may stand loaded with image bearing material so that the material of the second system can be projected directly after a displacement of the sleigh 16.

Various modifications are possible within the scope of the invention. Thus, it is for example possible to substitute a unitary film cassette for the film guide 17 and the winding rolls 18, 19. Thereby, the size of the sleigh 16 may be reduced substantially, so that the film cassette is the only unit, which protrudes from the proper projector and which is actuated when the other of the two projection systems is to be aligned with the common lens system and light source of the projector.

What is claimed is:

1. A projector for alternate projection of dia pictures and cinematographic film comprising: a lens system; a light source emitting light along a given path in a direction through said lens system; means mounting said light source for reciprocal linear movement along said path of its emitted light toward and away from said lens system; a link mechanism mounted upon a stationary point on said projector, said link mechanism being movable between a first and a second position; a condenser lens; a stationary frame for dia pictures; a film feeding mechanism including a film window; said condenser lens and said film feeding mechanism being mounted to said link mechanism for movement into and out of the path of said light emitted from said light source by movement of said link mechanism between said first and second positions; and means connecting said light source with said link mechanism to effect said reciprocal movement of said light source by movement of said link mechanism between said first and second positions; said link mechanism being arranged when moved to said first position to move said film feeding mechanism into operative position into the path of said emitted light in front of and close to said lens system, to move said light source toward said lens system in front of and close to said film window of said film feeding mechanism, and to move said condenser lens out of the path of said emitted light; with movement of said link mechanism to said second position operating to move said film feeding mechanism out of the path of said emitted light, to move said condenser lens to within the path of said emitted light in front of said stationary frame for the dia pictures, and to displace said light source rearwardly away from said lens system to a position behind said condenser lens.

2. A projector according to claim 1, further including a lens of addition fitted upon said film feeding mechanism in front of said film window.

3. A projector according to claim 1, wherein said link mechanism comprises a double arm lever with said film feeding mechanism being mounted upon one arm thereof and with said condenser lens being mounted upon the other arm thereof, with a link being provided which is pivotably fitted between said light source and the end of said other arm.

4. A projector according to claim 3, wherein said condenser lens and said film feeding mechanism are both mounted upon said double arm lever by connections which are of the slot-and-pin type.

5. A projector according to claim 1, wherein said film feeding mechanism includes film winding equipment for moving said film through said projector, said film feeding mechanism with said film winding equipment being mounted upon a sleigh which is displaceable and guided in a track extending transversely of said projector.

6. A projector according to claim 1, wherein said light source is mounted upon a support which is displaceable in a track along said projector.

7. A projector according to claim 1, wherein said light source comprises the outlet end of a light transmitting fibre optic.

8. A projector according to claim 1, wherein said link mechanism comprises a lever arm pivotally mounted at a point intermediate its ends, means mounting said condenser lens on one side of said intermediate point to enable both pivotal movement and longitudinal sliding movement of said condenser lens relative to said lever arm, means mounting said film feeding mechanism on the opposite side of said intermediate point to enable both pivotal movement and longitudinal sliding movement of said film feeding mechanism relative to said lever arm, and a linkage arm pivotally connected at one end thereof to said one end of said lever arm and at the other end thereof to said light source.

* * * * *